US008915054B2

(12) United States Patent
Speich (10) Patent No.: US 8,915,054 B2
(45) Date of Patent: Dec. 23, 2014

(54) ROTOR OF HAYMAKING MACHINE PROVIDED WITH ARMS IN TWO PARTS CONNECTED BY A CONNECTING DEVICE

(71) Applicant: Kuhn S.A., Saverne (FR)

(72) Inventor: Cedric Speich, Haguenau (FR)

(73) Assignee: Kuhn S.A., Saverne (FR)

( * ) Notice: Subject to any disclaimer, the term of this patent is extended or adjusted under 35 U.S.C. 154(b) by 149 days.

(21) Appl. No.: 13/780,268

(22) Filed: Feb. 28, 2013

(65) Prior Publication Data
US 2013/0219848 A1    Aug. 29, 2013

(30) Foreign Application Priority Data

Feb. 29, 2012 (FR) ..................... 12 51835

(51) Int. Cl.
| | | |
|---|---|---|
| *A01D 76/00* | (2006.01) | |
| *A01D 78/00* | (2006.01) | |
| *A01D 80/00* | (2006.01) | |
| *A01D 84/00* | (2006.01) | |
| *A01D 7/06* | (2006.01) | |
| *A01D 78/12* | (2006.01) | |

(52) U.S. Cl.
CPC ............. *A01D 7/06* (2013.01); *A01D 78/125* (2013.01)
USPC ............................... 56/400; 56/367

(58) Field of Classification Search
USPC ............ 56/400, 370, 367, 366, 396, 377; 411/383, 396, 367, 178; 403/13, 22, 403/299; 29/525, 525.2
See application file for complete search history.

(56) References Cited

U.S. PATENT DOCUMENTS

| | | | | |
|---|---|---|---|---|
| 3,475,890 A | * | 11/1969 | Maier et al. ..................... | 56/370 |
| 3,546,867 A | * | 12/1970 | Hauser-Lienhard ............ | 56/370 |
| 3,648,448 A | * | 3/1972 | Maugg ............................ | 56/370 |
| 3,664,105 A | * | 5/1972 | Stiefvater et al. ............... | 56/370 |
| 4,144,699 A | * | 3/1979 | Aron ............................... | 56/370 |
| 4,253,509 A | * | 3/1981 | Collet ........................... | 411/214 |

(Continued)

FOREIGN PATENT DOCUMENTS

| | | |
|---|---|---|
| DE | 197 46 216 A1 | 4/1999 |
| DE | 20 2009 014 404 U1 | 1/2010 |
| FR | 2 386 248 | 11/1978 |
| GB | 1 278 450 | 6/1972 |

OTHER PUBLICATIONS

French Preliminary Search Report and Written Opinion issued Nov. 7, 2012, in Patent Application No. FR 1251835, filed Feb. 29, 2012 (with English Translation of Category of Cited Documents).

*Primary Examiner* — Árpád Fábián-Kovács
(74) *Attorney, Agent, or Firm* — Oblon, Spivak, McClelland, Maier & Neustadt, L.L.P.

(57) ABSTRACT

A rotor comprising a rotary housing and at least one oscillating arm, the oscillating arm comprising at least an internal part connected to the housing and an external part carrying tools, one of the parts comprising an engaging portion able to engage partially in an engaged portion of the other part, the portions each comprising at least one hole and being able to be assembled by a connecting device comprising at least one threaded element with a shoulder, the threaded element passing through each hole of the portions. The connecting device comprises an insert with at least one tapping able to be inserted inside the engaging portion, the threaded element is screwed in the tapping and the shoulder rests on the engaged portion to tighten the engaged portion against the engaging portion.

18 Claims, 5 Drawing Sheets

(56) References Cited

U.S. PATENT DOCUMENTS

| | | | |
|---|---|---|---|
| 4,281,506 A * | 8/1981 | Wattron | 56/370 |
| 4,875,332 A * | 10/1989 | Aron | 56/377 |
| 4,914,901 A * | 4/1990 | Aron | 56/370 |
| 5,024,053 A * | 6/1991 | Aron | 56/367 |
| 5,060,465 A * | 10/1991 | Jerome | 56/367 |
| 5,163,277 A * | 11/1992 | Fransgaard | 56/366 |
| 5,377,482 A * | 1/1995 | Knigge | 56/370 |
| 5,548,949 A * | 8/1996 | Gantzer | 56/367 |
| 5,586,421 A * | 12/1996 | Aron | 56/367 |
| 5,791,133 A * | 8/1998 | Krone et al. | 56/367 |
| 6,272,826 B1 * | 8/2001 | Menichetti et al. | 56/367 |

* cited by examiner

ROTOR OF HAYMAKING MACHINE PROVIDED WITH ARMS IN TWO PARTS CONNECTED BY A CONNECTING DEVICE

BACKGROUND OF THE INVENTION

1. Field of the Invention

The present invention relates to a rotor of a haymaking machine, the rotor comprising a housing driven in rotation during work about a rotation axis directed upwards, and at least one oscillating arm arranged in a plane substantially perpendicular to the rotation axis, said oscillating arm comprising at least two parts, an internal part connected to the housing and an external part carrying work tools, one of the internal and external parts comprising an engaging portion able to engage along a longitudinal axis partially inside an orifice of an engaged portion of the other of the internal and external parts, the engaging portion and the engaged portion each comprising at least one hole oriented perpendicularly to the longitudinal axis and being able to be connected with one another by means of a connecting device, said connecting device comprising at least one threaded element having a geometric axis and provided with a shoulder, said threaded element passing through each hole of the engaging and engaged portions.

2. Discussion of the Background

In the known rotors of this type, the realization of the oscillating arm in at least two parts, namely the internal part and the external part, is justified by the constraints of packaging and by the constraints of repair of the arm in the case of impact during work. For packaging, the rotor is stored for example on a pallet. To minimize the transport costs, it is desirable to reduce the size of the rotor. Thus, the internal part remains connected to the housing, whereas the external part is separated from the internal part. During the windrowing work, the work tools can encounter obstacles such as stones, which generates great mechanical stresses on the arm. In the case of violent impact, the arm is designed so that the external part bends under the force, whilst the internal part remains intact. Thus, it is sufficient for the user of the machine to dismantle the external part from the internal part, and to straighten or replace the external part, to return the machine into a functional state. Such an operation is simple and costs little.

The threaded element, serving to connect the internal and external parts, is for example formed by a screw with a square or hexagonal head, which passes right through the engaging and engaged parts, and cooperates with a nut to form a bolt. This bolt is tightened on the engaged portion so as to ensure the maintaining of the engaging portion inside of the engaged portion during the rotation of the rotor. The bolt is tightened at a torque which must on one hand prevent its unexpected loosening, and on another hand deform the engaged portion along the geometric axis so that it comes to tighten the engaging portion.

On assembly, a large amount of play can exist between the portions, so that the engaging portion can engage easily inside of the engaged portion. In this case, the tightening of the bolt at a torque allowing to prevent its unexpected loosening is not sufficient for the engaged portion to come to tighten the engaging portion. The compensation of the large amount of assembly play requires a greater torque. Now, the majority of the time, the user of the machine uses the standard equipment which is readily available, for example a conventional thin spanner. Such equipment does not allow tightening to be carried out at the required torque with a good degree of precision. An operating play therefore remains between the portions, which brings about a premature wear of the machine. The user may be tempted to eliminate this play by tightening the bolt with much more force, by mounting, for example, an extension on the tightening spanner. Because this way of proceeding does not permit the force to be proportioned, the engaging and engaged portions are greatly deformed, which makes their subsequent dismantling difficult, even impossible.

On the contrary, a smaller assembly play between the portions may be preferred, so that a relatively small tightening torque, able to be carried out by the user, permits the engaged portion to be tightened against the engaging portion. In this case, the torque which is thus realized is less than the torque required to prevent an unexpected loosening of the bolt, which can bring about its loss and the detachment of the external part of the oscillating arm. Thus, the safety of use of the machine is not optimal. In the case where the bolt is tightened to the required torque to prevent the said unexpected loosening, the deformation of the engaging and engaged portions, which results from this tightening, is such that it makes the sliding of the engaging portion inside the engaged portion with a view to dismantling difficult, even impossible. The use of the machine is indeed complicated.

SUMMARY OF THE INVENTION

The present invention has the aim of proposing a rotor of a haymaking machine which does not present the above-mentioned drawbacks.

To this effect, an important feature of the invention lies in the fact that the connecting device comprises an insert with at least one tapping being able to be arranged in an interior part of the engaging portion, that the threaded element is screwed in the said tapping and that the shoulder of the said threaded element rests on the engaged portion so as to tighten the engaged portion against the engaging portion along the geometric axis.

Thus, the tightening of the engaged portion against the engaging portion does not require any, or only a little, deformation of these portions. A large assembly play can therefore be envisaged to guarantee an easy sliding of the engaging portion in the engaged portion. The assembly of the arm is therefore easy. The tightening by the user at a torque, preventing the unexpected loosening of the connecting device, ensures at the same time the absence of operating play, along the geometric axis, between the insert, the engaging portion and the engaged portion. The invention therefore guarantees simultaneously the safety of use of the machine and a durable operation.

According to an advantageous feature of the invention, the dimension of the insert, measured along the geometric axis, is close to the dimension of the interior part of the engaging portion along this same axis. Furthermore, the connecting device can comprise a single threaded element cooperating with a nut, or else two threaded elements. It is thus possible to eliminate all the assembly plays, along the geometric axis, existing between the engaged portion, the engaging portion and the insert, which further increases the safety of use and the durability of the machine. In addition, the insert limits the crushing of the engaging and engaged portions during tightening of the connecting device, which facilitates their subsequent dismantling.

BRIEF DESCRIPTION OF THE DRAWINGS

Other characteristics and features of the invention will emerge from the following description with reference to the attached drawings which represent, by way of non-restrictive example, several embodiments of the rotor according to the invention.

In these drawings.

DESCRIPTION OF THE PREFERRED EMBODIMENT

Figure 1:
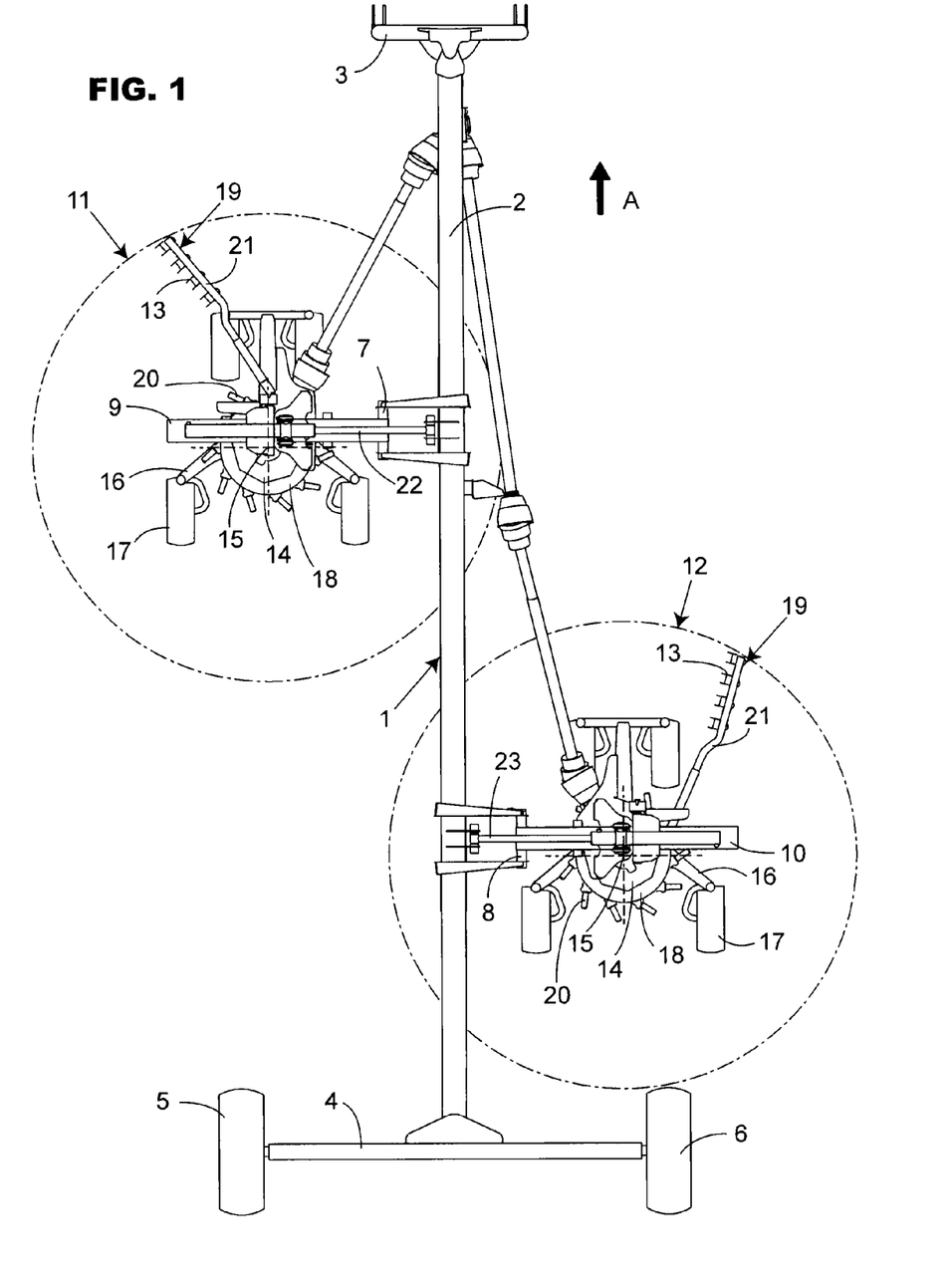
FIG. 1 represents a top view of a haymaking machine according to the invention, comprising at least one rotor provided with oscillating arms.

As represented in FIG. 1, the machine according to the invention is a windrower of plants lying on the ground. It comprises a support structure 1 including a central beam 2 which has at its front end a coupling device 3 to hitch it to a tractor, not shown, making it possible to move the machine in a direction of advance A. In the rest of the description, the term "front" is defined with respect to the direction of advance A.

The central beam 2 has at its rear end a crossbar 4 provided with wheels 5 and 6 which roll over the ground. On each side of the central beam 2 there is articulated, by means of a substantially horizontal axis 7, 8, an arm 9, 10 which carries a rotor 11, 12 with work tools 13 intended to windrow products such as grass or cut straw lying on the ground. In the example which is represented, the arms 9 and 10 and the corresponding rotors 11 and 12 are offset in the direction of advance A. The plants windrowed by the rotor 11 which is the furthest in front can be taken up again by the rotor 12 which is the furthest at the back for the formation of a single windrow having a greater volume.

The central beam 2 could comprise only a single arm and a single rotor. It could also comprise no arm and only a single rotor carried directly by the central beam 2. The central beam 2 could also comprise, on each side, two offset arms with different lengths and each carrying a rotor. In this case, the machine would comprise four rotors which would allow it to achieve a greater working width.

Figure 2:
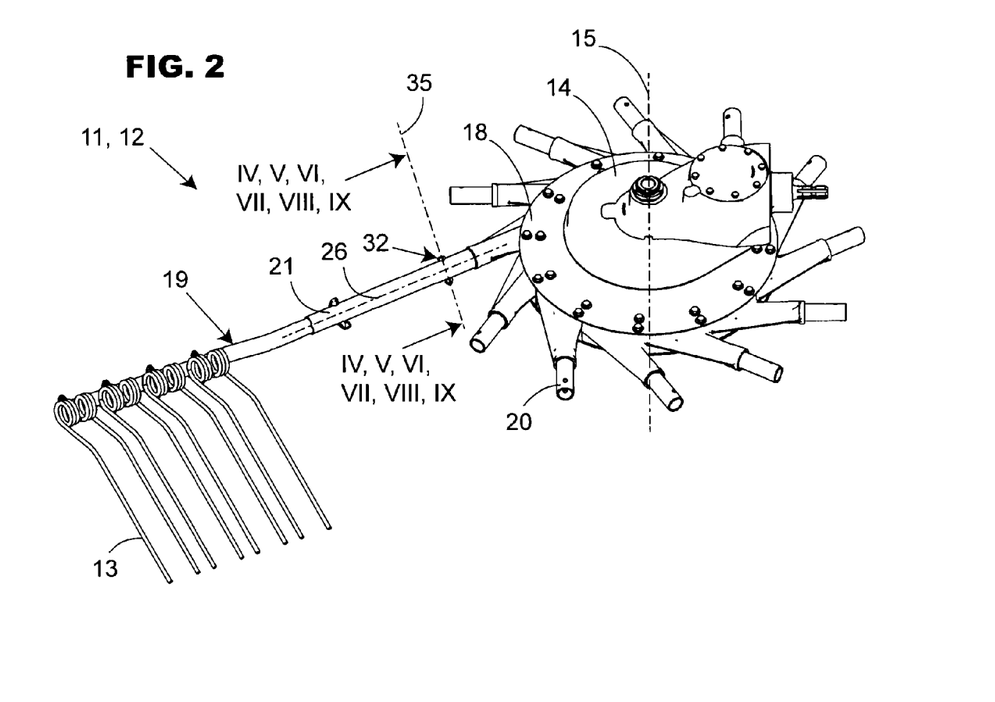
FIG. 2 represents a partial view in perspective of a rotor according to the invention, a single oscillating arm being represented in totality.

The rotors 11 and 12 are substantially identical. Each comprises a casing 14 which is connected to the corresponding arm 9, 10 and which carries a central rotation axis 15 which is substantially vertical or slightly inclined towards the front. This rotation axis 15 comprises at its lower end a support 16 with carrier wheels 17 situated beneath the rotor 11, 12. These latter roll over the ground during work and bring the rotors 11 and 12 to follow the differences in level of the ground. The support 16 and the carrier wheels 17 can advantageously slide along the rotation axis 15 so as to adjust the distance of the work tools 13 with respect to the ground, for example by means of a jack.

On the part of the rotation axis 15, which extends beneath the casing 14, a housing 18 is arranged. The latter is mounted on the rotation axis 15 by means of bearings so as to be able to be driven in rotation. The upper side of the housing 18 is provided with a toothed wheel which is situated in the casing 14. This wheel meshes with a pinion, which can be connected to a power take-off of the tractor by means of intermediate transmission shafts known to those skilled in the art. The driving in rotation of the rotor 11, 12 could also be carried out with a hydraulic or electric motor. The housing 18 supports a plurality of oscillating arms 19. The latter extend in the form of radii with respect to the rotation axis 15, in a plane substantially perpendicular to the latter. The oscillating arms 19 comprise at least two parts, an internal part 20 connected to the housing, and an external part 21 carrying the work tools 13 such as forks. The internal parts 20 of the oscillating arms 19 are connected to the housing 18 by one or more bearings, so as to be able to turn on themselves. On the part of the rotation axis 15 which is situated in the housing 18 a fixed cam is mounted, intended to control the oscillating arms 19 during the windrowing work. For this, each of the oscillating arms 19 has at its end which extends inside the housing 18 a lever with a roller which is guided in a groove of the cam. During work, the work tools 13 gather the products in particular on the front part of their path and deposit them in the form of a windrow in the lateral part of their path.

Each arm is equipped with a hydraulic jack 22, 23, which makes it possible to pivot it about the axis 7, 8. Each hydraulic jack 22, 23 is articulated with one of its ends on the central beam 2 and with its other end on the corresponding arm 9, 10. Each hydraulic jack 22, 23 can be double-acting, so as to be able to be controlled during extension and during contraction, and permits the corresponding arm 9, 10 to be moved between a transport position and a work position. In the transport position, each rotor 11, 12 extends in a plane which is substantially vertical or close to the vertical, so that the overall dimensions of the machine are reduced in width. In the work position, each rotor 11, 12 extends in a substantially horizontal plane.

In the described variant embodiments, the oscillating arms 19 have a circular cross-section. However, oscillating arms 19 of parallelepipedic, oval or other cross-section are possible, this list not being restrictive. Other more elaborate shapes can be envisaged, such as a grooved profile or a "lemon" profile known to those skilled in the art.

Figure 3:
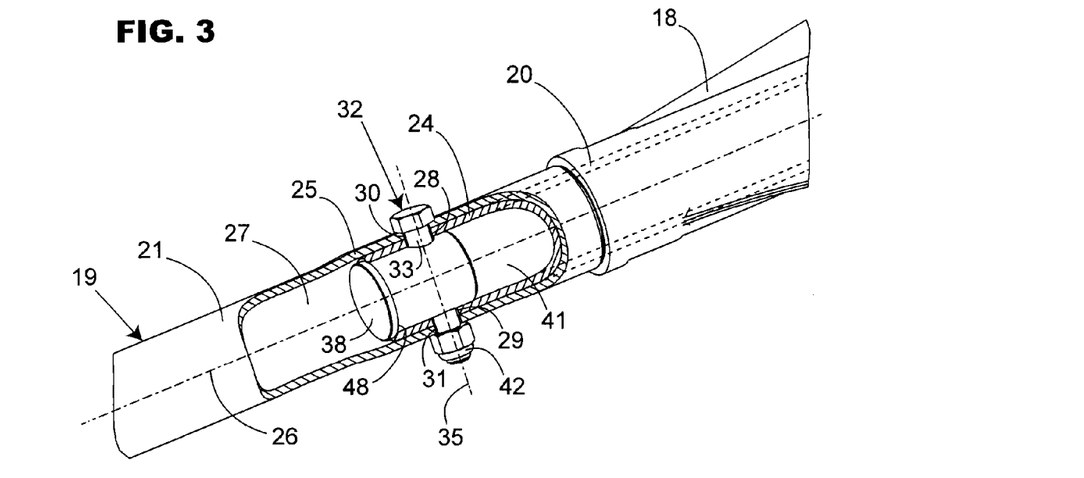
FIG. 3 represents a view in partial section of a first variant embodiment of a connecting device according to the invention.

As is represented in particular in FIG. 3, the internal part 20 of the oscillating arm 19 comprises an engaging portion 24, whilst the external part 21 comprises an engaged part 25. According to a variant embodiment, which is not shown, it would be possible for the engaging portion 24 to be connected to the external part 21 and for the engaged portion 25 to be connected to the internal part 20. It can be seen in FIG. 3 that the engaging portion 24 extends from the housing 18 over some distance along a longitudinal axis 26, which longitudinal axis 26 corresponds substantially to the axis about which the internal part 20 turns on itself with respect to the housing 18. The engaged portion 25 comprises an orifice 27 preferably formed by the fact that the external part 21 is hollow. The external part 21 could also be solid and the orifice 27 formed by the removal of material in the external part 21. This orifice 27 extends along the longitudinal axis 26 and its diameter is greater than or almost equal to the exterior diameter of the engaging portion 24, such that this latter can engage freely along the longitudinal axis 26 partially inside the orifice 27. As can be seen from the different variant embodiments illustrated in FIGS. 4 to 9, the engaging portion 24 and the engaged portion 25 each comprise at least one hole 28, 29, 30, 31 oriented perpendicularly to the longitudinal axis 26. The hole or holes 28, 29 of the engaging portion 24 and the hole or holes 30, 31 of the engaged portion 25 are arranged facing one another. A connecting device 32 makes it possible to connect the engaging portion 24 and the engaged portion 25 with one another. This connecting device 32 comprises at least one threaded element 33, 34 having a geometric axis 35, which threaded element 33, 34 comprises a shoulder 36, 37. In the variant embodiment of FIG. 4, the threaded element 33 is constituted by a screw with a hexagonal head, and the shoulder 36 is formed by the lower face of the head. The threaded element 33, 34 has an exterior diameter, the value of which is slightly less than or equal to the diameter of each hole 28, 29, 30, 31. "Slightly less" is understood to mean that the said diameters differ by a value less than one millimeter, for example less than five tenths of a millimeter. In this way, the threaded element 33, 34 can be introduced manually, without great force, through the hole or holes 28, 29 of the engaging portion 24 and through the hole or holes 30, 31 of the engaged portion 25. In addition, the threaded element 33, 34 is likely to transmit a portion of the rotation torque exerted by the internal part 20 on the external part 21, by contact of the holes 28, 29, 30, 31 with the threaded portion of the threaded element 33, 34. Automatically, the introduction of the threaded element 33, 34 through the holes 28, 29, 30, 31 orients the said portions 24, 25 with respect to one another about the longitudinal axis 26. In addition, the rotation of the internal part 20 of the oscillating arm 19 on itself is transmitted to the external part 21, and the latter cannot move along the longitudinal axis 26 during the pivoting of the housing 18 about the rotation axis 15.

According to an important feature of the invention, the connecting device 32 comprises an insert 38. The insert 38 can be of metallic or synthetic material and can result from machining, moulding, cutting or forging operations. It comprises at least one tapping 39, 40 able to cooperate with the threaded element 33, 34. The engaging portion 24 comprises an interior part 41. The latter is preferably formed by the fact that the internal part 20 of the oscillating arm 19 is hollow. The interior part 41 could also be formed by removal of material in the internal part 20. The insert 38 is designed such that it can be arranged in the interior part 41. The shape of the insert 38 corresponds to that of the interior part 41. The insert 38 is oriented about the longitudinal axis 26 such that the tapping 39, 40 is directed colinearly to the geometric axis 35 of the threaded element 33, 34. As can be seen from FIG. 3, the insert 38 can be provided, in addition, with a shoulder 48 able to rest against the engaging portion 24 along the longitudinal axis 26 so as to facilitate the assembly.

The assembly operations of the oscillating arm 19 are sequenced in the manner described below. The user arranges the insert 38 in the interior part 41 of the engaging portion 24 so that the tapping or tappings 39, 40 are substantially opposite the hole or holes 28, 29 of the engaging portion 24. He then partially engages the engaging portion 24 in the orifice 27 of the engaged portion 25, or, on the contrary, the orifice 27 of the engaged portion 25 on the engaging portion 24, until the hole or holes 30, 31 of the engaged portion 25 are substantially opposite the hole or holes 28, 29 of the engaging portion 24. Then the user introduces the threaded element 33 through the holes 28, 30, or else the threaded element 33 through the holes 28, 30 and the threaded element 34 through the holes 29, 31. The user then screws the threaded element or elements 33, 34 in the tapping or tappings 39, 40 of the insert 38 so that the corresponding shoulder or shoulders 36, 37 rest on the engaged portion 25, and so that, on the side of at least one of the said shoulders 36, 37, the engaged portion 25 is tightened against the engaging portion 24 along the geometric axis 35.

FIGS. 4 to 9 apply to variant embodiments, in which the engaging portion 24 and the engaged portion 25 each comprise two holes 28 and 29, 30 and 31 oriented perpendicularly to the longitudinal axis 26.

Preferably, the engaging portion 24 and the engaged portion 25 each comprise two holes 28 and 29, 30 and 31 and the holes 28 to 31 are all oriented along the geometric axis 35.

Figure 4:
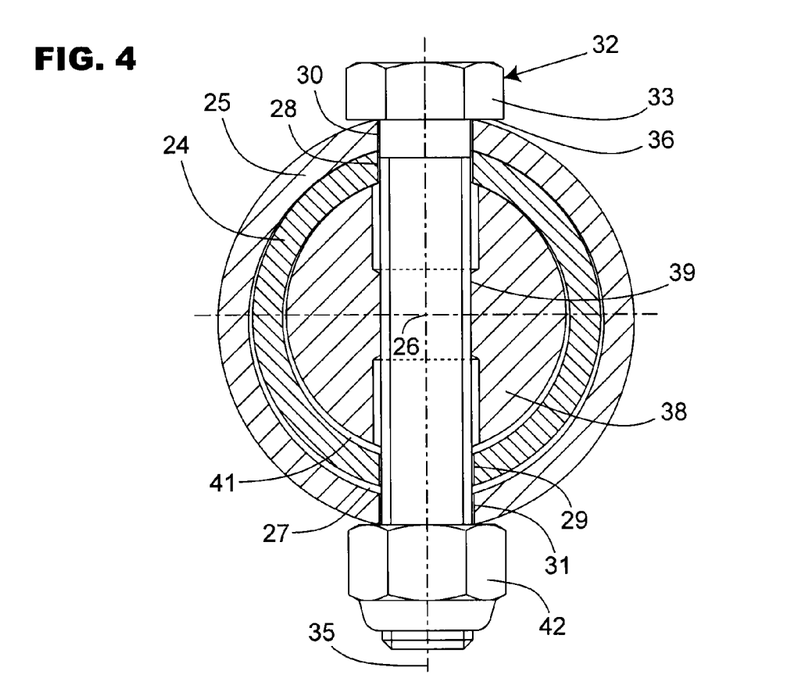
FIG. 4 represents a view of the first variant embodiment of the connecting device according to the section IV-IV of FIG. 2.

According to an advantageous feature of the invention, the dimension of the insert 38, measured along the geometric axis 35, is close to the dimension of the interior part 41 of the engaging portion 24 along this same axis. This means that the said dimension of the insert 38 can be slightly less than, equal to or slightly greater than the said dimension of the interior part 41. "Slightly less" is understood to mean that the insert 38 can be mounted in the interior part 41 with an adjustment play which is positive and less than a few millimeters, preferably less than one millimeter, for example less than five tenths of a millimeter. This case is illustrated by FIG. 4. "Slightly greater" is understood to mean that the insert 38 can be mounted in the interior part 41 with a negative adjustment play, i.e. with tightening, of an absolute value less than one tenth of a millimeter, preferably less than five hundredths of a millimeter. This slight tightening allows the assembly of the insert 38 in the interior part 41 by means, for example, of a mallet.

In the variant embodiment of FIG. 4, the connecting device 32 comprises a single threaded element 33, which passes through two holes 30 and 31 of the engaged portion 25 and two holes 28 and 29 of the engaging portion 24. The holes 28 to 31 of each portion 24, 25 are diametrically opposed so that all the holes 28 to 31 of the engaging and engaged portions 24 and 25 are oriented along the geometric axis 35 of the threaded element 33. The connecting device 32 comprises in addition a nut 42. The threaded element 33 cooperates with the nut 42 resting on the engaged portion 25, either to tighten the engaging portion 24 and the engaged portion 25 between the insert 38 and the nut 42 or to brake the threaded element 33.

Figure 8:
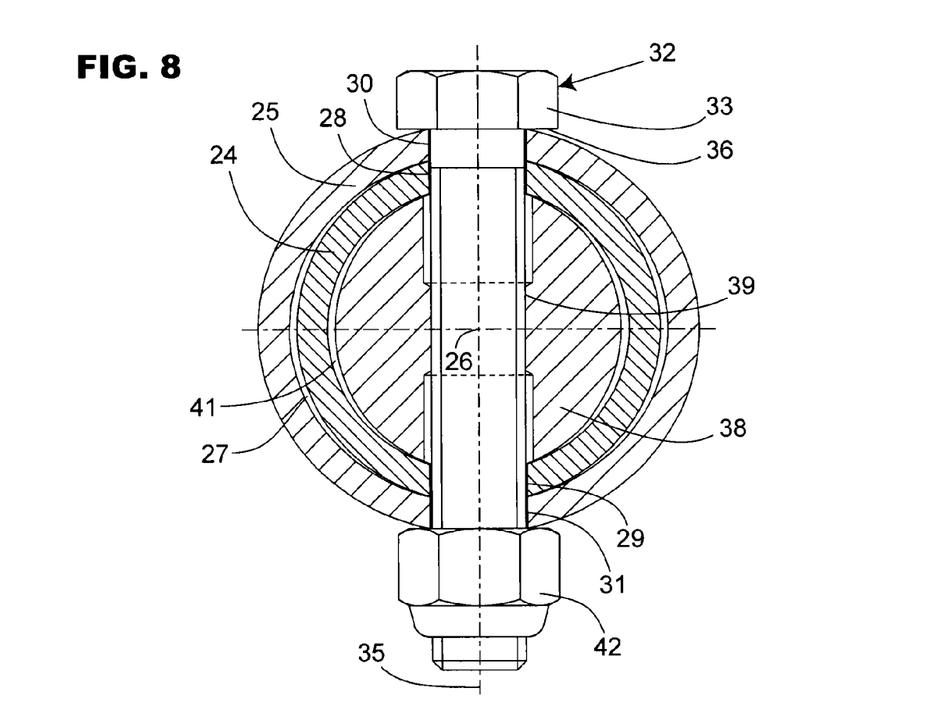
FIG. 8 represents another view of the first variant embodiment of the connecting device according to the section VIII-VIII of FIG. 2.

FIG. 8 represents the case in which the threaded element 33 cooperates with the nut 42 resting on the engaged portion 25 to tighten the engaging portion 24 and the engaged portion 25 between the insert 38 and the nut 42. In this case, all the existing assembly plays, along the geometric axis 35, between the engaged portion 25, the engaging portion 24 and the insert 38, are eliminated, in the vicinity both of the shoulder 36 and of the nut 42. In addition, if the insert has along the geometric axis 35 a dimension which is slightly less than that of the interior part 41, measured along the same axis, the tightening of the nut 42 brings about a slight deformation of the portions 24 and 25 in their elastic range, in the vicinity of the nut 42. The insert 38 thus limits the crushing of the engaging and engaged portions 24 and 25, since the engaging portion 24 no longer deforms when it comes to rest on the insert 38. If, on another hand, the insert 38 is mounted in the interior part 41 with a zero or negative adjustment play, the tightening of the nut 42 brings about, in its vicinity, the sole deformation of the engaged portion 25 so that the latter comes in contact with the engaging portion 24.

FIG. 4 represents the case in which the threaded element 33 cooperates with the nut 42 resting on the engaged portion 25 to brake the threaded element 33. In this case, a part of the existing assembly plays, along the geometric axis 35, between the insert 38, the engaged portion 25, the engaging portion 24 and the nut 42, remains, and the nut plays the role of a check-nut preventing an inadvertent loosening of the threaded element 33 in the interior of the tapping 39 of the insert 38.

In the two cases which have just been cited, the use of the nut 42 increases the safety of use and the durability of the machine.

Figure 5:
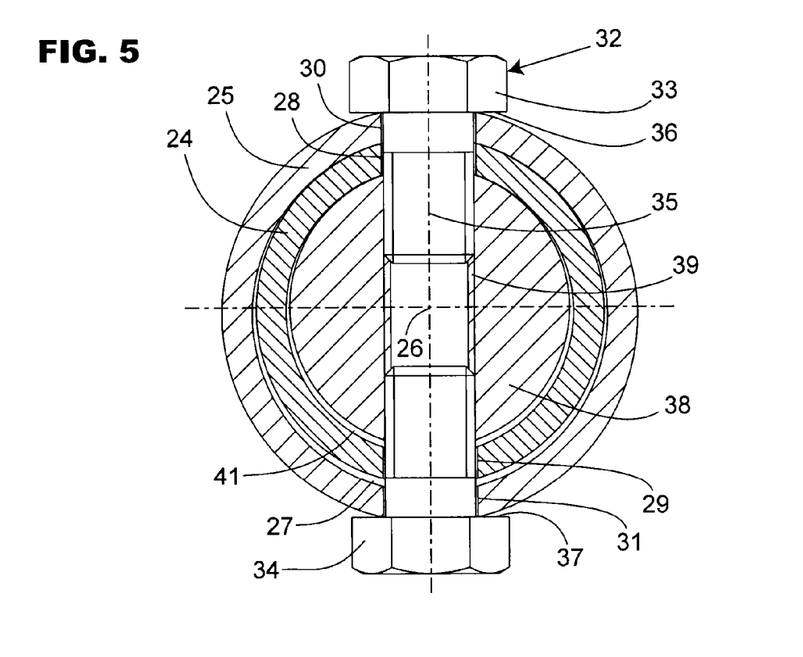
FIG. 5 represents a view of a second variant embodiment of the connecting device according to the section V-V of FIG. 2.
Figure 6:
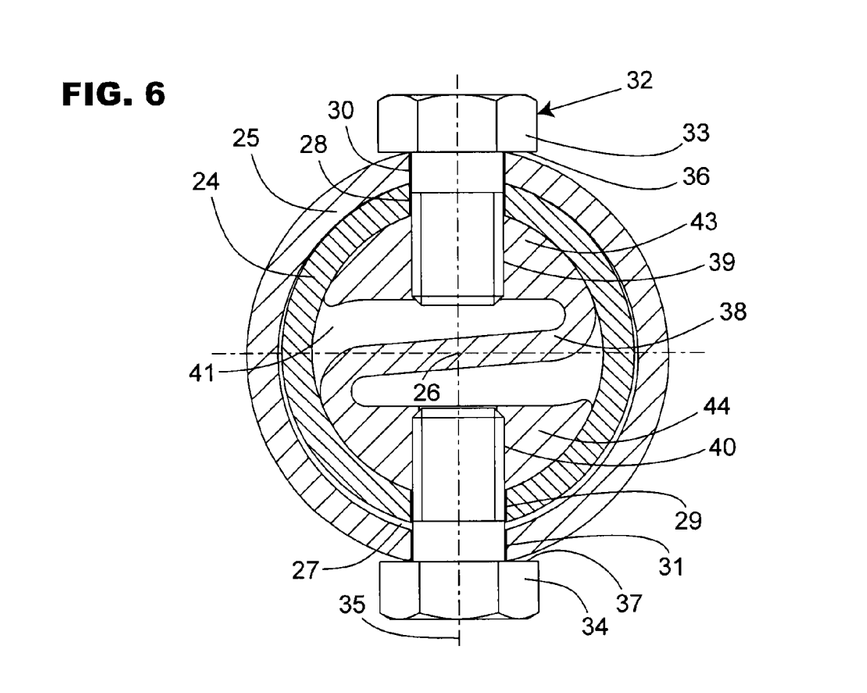
FIG. 6 represents a view of a third variant embodiment of the connecting device according to the section VI-VI of FIG. 2.
Figure 7:
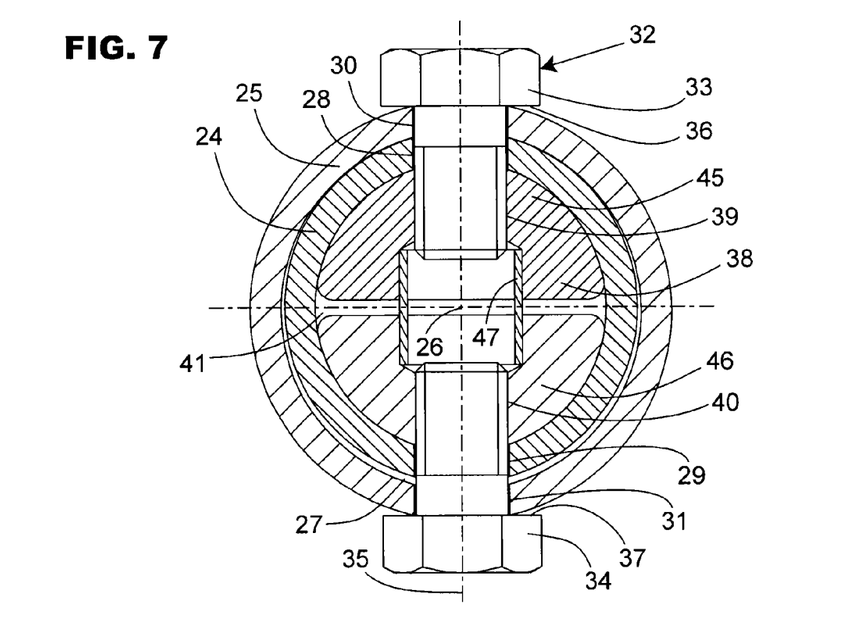
FIG. 7 represents a view of a fourth variant embodiment of the connecting device according to the section VII-VII of FIG. 2.

As can be seen from FIGS. 5 to 7, the connecting device 32 can comprise two threaded elements 33 and 34 each with a shoulder 36, 37 and each threaded element 33, 34 is screwed in the insert 38 so that the corresponding shoulder 36, 37 rests on the engaged portion 25. In these figures, the upper threaded element 33 is tightened so that the engaging and engaged portions 24 and 25 are tightened between the upper threaded element 33 and the insert 38.

In these figures, the lower threaded element 34 is represented partially tightened. In this case, the threaded element 34 aims essentially to transmit a portion of the rotation torque of the internal part 20 towards the external part 21, by contact of the threaded portion of the said threaded element 34 with the holes 29 and 31. This therefore avoids transmitting the entire rotation torque by the sole threaded element 33.

Figure 9:
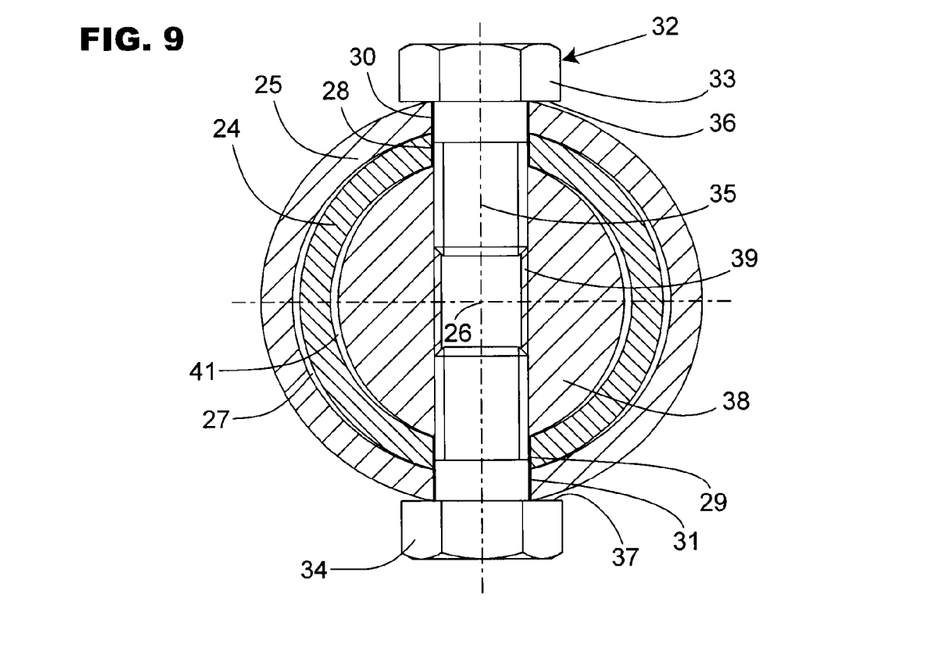
FIG. 9 represents another view of the second variant embodiment of the connecting device according to the section IX-IX of FIG. 2.

As is represented in FIG. 9, the lower threaded element 34 is more tightened, like the upper threaded element 33. Thus, each respective threaded element 33, 34 tightens the engaging portion 24 and the engaged portion 25 between the insert 38 and its respective shoulder 36, 37, such that no operating play remains along the geometric axis 35. The insert 38 therefore limits the crushing of the engaging and engaged portions 24 and 25.

In the variant embodiments of FIGS. 4 and 5, the insert 38 is a rigid part. "Rigid part" is understood to mean that the insert 38, during tightening of the connecting device 32, undergoes deformations which remain negligible with respect to those which the engaging and engaged portions 24 and 25 can undergo. In the variant embodiment of FIG. 4, the insert 38 comprises a tapping 39, the length of which is smaller than the dimension of the insert 38 measured along the geometric axis 35, i.e. smaller than the diameter of the insert 38. The insert 38 comprises two non-tapped holes situated in the extension of the tapping 39 and on either side thereof, the diameter of the said holes being greater than the interior diameter of the tapping 39. Preferably, the tapping 39 is substantially centred with respect to the longitudinal axis 26. This construction places the shoulder 36 and the nut 42 at some distance from the first engaged threads of the threaded element 33 at the level of the tapping 39. It reduces the risk of loosening of the threaded element 33 and of the nut 42 induced, during operating, by the forces exerted by the engaging and engaged portions 24 and 25 on the threaded element 33.

The variant embodiments of FIGS. 6 and 7 make use of an insert 38 able to lengthen elastically along the geometric axis 35. In these variants the insert 38 has, along the geometric axis 35, a dimension before assembly which can be smaller than, equal to or greater than the dimension along this same axis of the interior part 41. In the case where its dimension before assembly is greater, the insert 38 compresses along the geometric axis 35 so as to be able to engage in the interior part 41. Thus, the insert 38 can itself remain in place in the engaging portion 24. After having tightened the upper threaded element 33 so that the engaging portion 24 and the engaged portion 25 are tightened between the insert 38 and the upper threaded element 33, the user comes to tighten the lower threaded element 34. During tightening of the latter, the elastic insert 38 can lengthen so as to compensate the play which possibly separates it from the engaging portion 24. Therefore, the engaging portion 24 deforms very little. The essential of the deformations is undergone by the engaged portion 25 to come to flatten itself against the engaging portion 24. In the variant embodiments of FIGS. 6 and 7, the mechanical stresses on the engaging portion 24, induced by the tightening of the connecting device 32, are therefore particularly small.

In the variant embodiment of FIG. 6, the insert 38 is an elastic S-shaped part, the upper branch 43 and the lower branch 44 of which each comprise their own tapping 39, respectively 40.

In the variant embodiment of FIG. 7, the insert 38 comprises two distinct halves 45 and 46 able to move one with respect to the other along the geometric axis 35. The halves 45 and 46 each comprise a tapping 39, respectively 40 and move away one from the other along the geometric axis 35 during the tightening of the connecting device 32.

In this same variant, the two distinct halves 45 and 46 are preferably assembled by means of a centring device 47 slidably mounted in at least one of the halves 45, 46. Such a construction makes the implementation of the insert 38 in the interior part 41 of the engaging portion 24 easier.

The preceding description relates to a windrower of plants lying on the ground, provided with at least one windrowing rotor, the rotation axis of which is preferably vertical in the work position. However, the invention can also relate to a tedder provided, instead of and in place of the said at least one windrowing rotor, with at least one tedding rotor, the rotation axis of which is, for example, inclined in the direction of advance. More generally, the invention concerns any haymaking machine comprising at least one rotor provided with arms carrying work tools. Such a machine can be, for example, a windrower, a press or a loader wagon provided with a gathering member with fingers, of the "pick-up" type and which comprises a rotor according to the invention, arranged for example at one of the lateral ends of the said gathering member. The rotation axis of the rotor can be arranged in a vertical plane or in a horizontal plane.

It is readily evident that the invention is not limited to the embodiments described above and represented in the attached figures. Modifications remain possible, in particular with regard to the constitution or the number of the various elements or by substitution of technical equivalents without, however, departing from the scope of protection.

What is claimed as new and desired to be secured by Letters Patent of the United States is:

1. A rotor of a haymaking machine, the rotor comprising a housing driven in rotation during work about a rotation axis directed upwards, and at least one oscillating arm arranged in a plane substantially perpendicular to the rotation axis, said oscillating arm comprising at least two parts, an internal part connected to the housing and an external part carrying work tools, one of the internal and external parts comprising an engaging portion able to engage along a longitudinal axis partially inside an orifice of an engaged portion of the other of the internal and external parts, the engaging portion and the engaged portion each comprising at least one hole oriented perpendicularly to the longitudinal axis and being able to be connected with one another by means of a connecting device, said connecting device comprising at least one threaded element having a geometric axis and provided with a shoulder, said threaded element passing through each hole of the engaging and engaged portions, wherein the connecting device comprises an insert with at least one tapping which can be arranged in an interior part of the engaging portion, and wherein the threaded element is screwed in the tapping, and wherein the shoulder rests on the engaged portion so as to tighten the engaged portion against the engaging portion along the geometric axis.

2. The rotor according to claim 1, wherein the threaded element has an exterior diameter, the value of which is slightly less than or equal to the diameter of each hole of the engaging and engaged portions.

3. The rotor according to claim 1, wherein the engaging portion and the engaged portion each comprise two holes oriented perpendicularly to the longitudinal axis.

4. The rotor according to claim 3, wherein the engaging portion and the engaged portion each comprise two holes, and wherein the holes are all oriented along the geometric axis.

5. The rotor according to claim 1, wherein along the geometric axis, the dimension of the insert is close to the dimension of the interior part of the engaging portion.

6. The rotor according to claim 4, wherein the connecting device comprises a single threaded element and a nut, and wherein the threaded element passes through the holes of the engaging portion and the holes of the engaged portion and cooperates with the nut resting on the engaged portion to tighten the engaging portion and the engaged portion between the insert and the nut.

7. The rotor according to claim 4, wherein the connecting device comprises a single threaded element and a nut, and wherein the threaded element passes through the holes of the engaging portion and the holes of the engaged portion and cooperates with the nut resting on the engaged portion to brake the threaded element.

8. The rotor according to claim 6, wherein the tapping has a length smaller than the dimension of the insert measured along the geometric axis.

9. The rotor according to claim 7, wherein the tapping has a length smaller than the dimension of the insert measured along the geometric axis.

10. The rotor according to claim 3, wherein the connecting device comprises two threaded elements each with a shoulder, and wherein each threaded element is screwed in the insert so that the corresponding shoulder rests on the engaged portion.

11. The rotor according to claim 1, wherein the insert is a rigid part.

12. The rotor according to claim 4, wherein the insert can lengthen elastically along the geometric axis.

13. The rotor according to claim 12, wherein the insert is an S-shaped elastic part.

14. The rotor according to claim 12, wherein the insert comprises two distinct halves able to move one with respect to the other along the geometric axis.

15. The rotor according to claim 14, wherein the two distinct halves are assembled by means of a centring device slidably mounted in at least one of the halves.

16. The rotor according to claim 9, wherein each respective threaded element tightens the engaging portion and the engaged portion between the insert and its respective shoulder.

17. The rotor according to claim 1, wherein the insert comprises a shoulder which can rest against the engaging portion along the longitudinal axis.

18. A haymaking machine comprising at least one rotor according to any one of claims 1 to 17.

* * * * *